US011268629B2

United States Patent
Beckwith et al.

(10) Patent No.: US 11,268,629 B2
(45) Date of Patent: Mar. 8, 2022

(54) WATER METER TOOL

(71) Applicant: OLYMPIA TOOLS INTERNATIONAL, INC., Covina, CA (US)

(72) Inventors: Jonathan S. Beckwith, Durham, NC (US); Roger Dale Hurley, Jr., Raleigh, NC (US)

(73) Assignee: Olympia Tools International, Inc., Covina, CA (US)

( * ) Notice: Subject to any disclaimer, the term of this patent is extended or adjusted under 35 U.S.C. 154(b) by 0 days.

(21) Appl. No.: 16/899,333

(22) Filed: Jun. 11, 2020

(65) Prior Publication Data

US 2021/0388920 A1    Dec. 16, 2021

(51) Int. Cl.
*F16K 31/60* (2006.01)
*G01F 15/00* (2006.01)
*G01D 4/02* (2006.01)
*G01F 15/14* (2006.01)

(52) U.S. Cl.
CPC .............. *F16K 31/60* (2013.01); *G01D 4/02* (2013.01); *G01F 15/005* (2013.01); *G01F 15/14* (2013.01)

(58) Field of Classification Search
CPC ........ F16K 31/60; G01F 15/005; G01F 15/14; G01D 4/02
See application file for complete search history.

(56) References Cited

U.S. PATENT DOCUMENTS

| | | | | |
|---|---|---|---|---|
| 4,125,913 A * | 11/1978 | Lewis | ................... | B25B 13/48 7/138 |
| 4,334,443 A * | 6/1982 | Pearson | ................. | B25B 13/48 81/55 |
| D306,820 S * | 3/1990 | Crumpler | ...................... | D8/347 |
| D370,606 S * | 6/1996 | Cole | .............................. | D8/21 |
| 7,000,897 B2 * | 2/2006 | Chick | ..................... | F16K 31/46 251/293 |
| 7,118,091 B2 * | 10/2006 | Price | ..................... | B25B 21/002 251/293 |
| 7,661,338 B2 * | 2/2010 | Kochling | ................ | B25B 13/06 81/121.1 |
| 2012/0073408 A1 * | 3/2012 | Leighton | ................ | B25B 23/16 81/177.2 |
| 2013/0014615 A1 * | 1/2013 | Peterson | ................. | B25B 13/02 81/119 |
| 2014/0021393 A1 * | 1/2014 | Sanchez, Jr. | ............ | F16K 31/60 251/292 |

OTHER PUBLICATIONS 4-in-1 Water Meter Key Combo Tool, available at: https://www.homedepot.com/p/VPC-4-in-1-Water-Meter-Key-Combo-Tool-17-1003/302465240 (accessed on Jun. 10, 2020).

* cited by examiner

*Primary Examiner* — Jessica Cahill
*Assistant Examiner* — Patrick C Williams
(74) *Attorney, Agent, or Firm* — Patterson + Sheridan, LLP

(57) ABSTRACT

An apparatus and method for operating water meter valves is disclosed herein. A water meter tool includes a body extending longitudinally from a first end to a second end. The body includes a water meter valve key at the first end and a hole formed through the body between the first and second ends, where a center line of the hole is in a transverse plane of the body. The water meter tool includes a movable cross arm disposed through the hole, where the movable cross arm extends along a longitudinal axis from a first arm end to a second arm end, and where the movable cross arm includes a first box key proximate the first arm end.

9 Claims, 8 Drawing Sheets

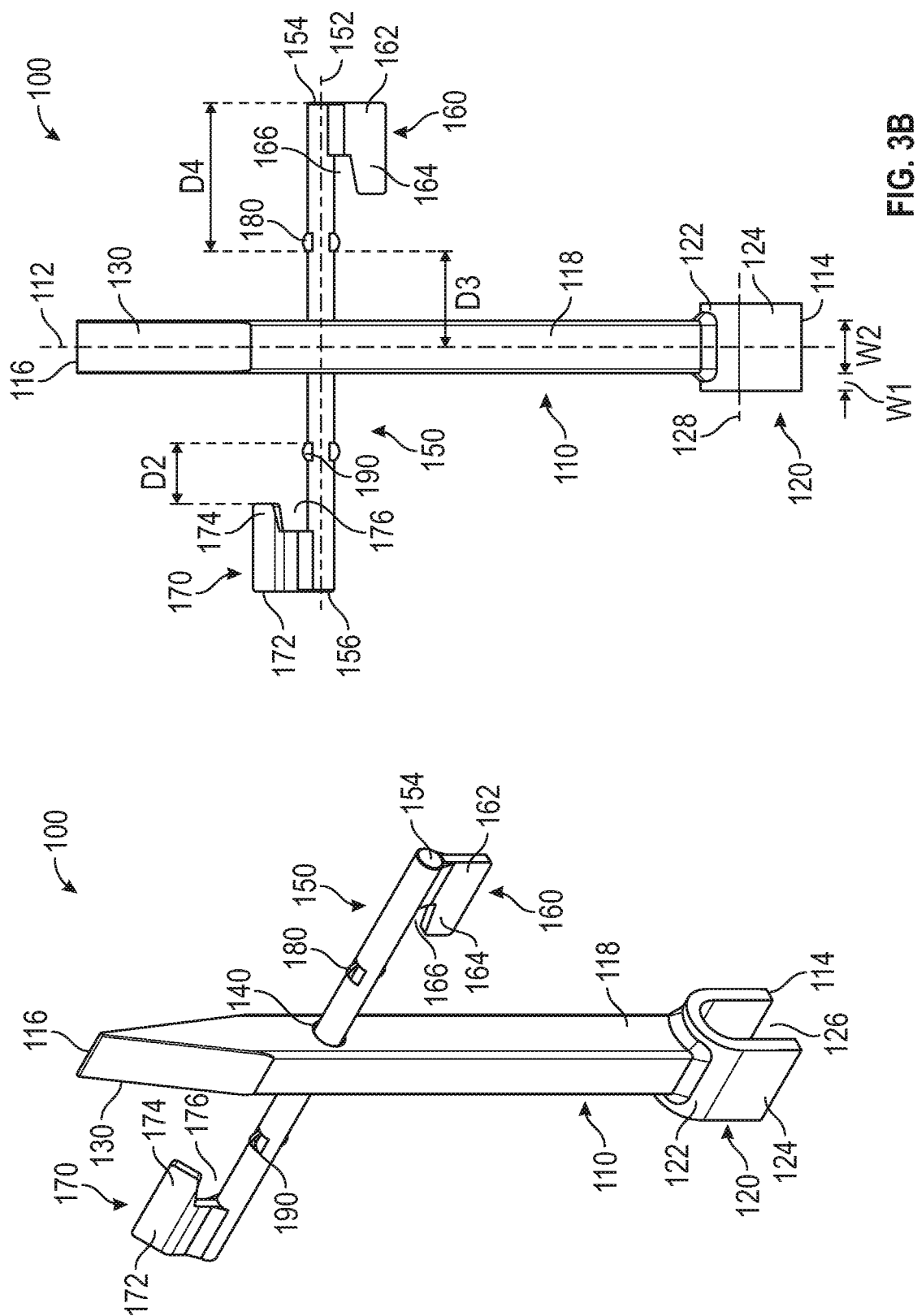

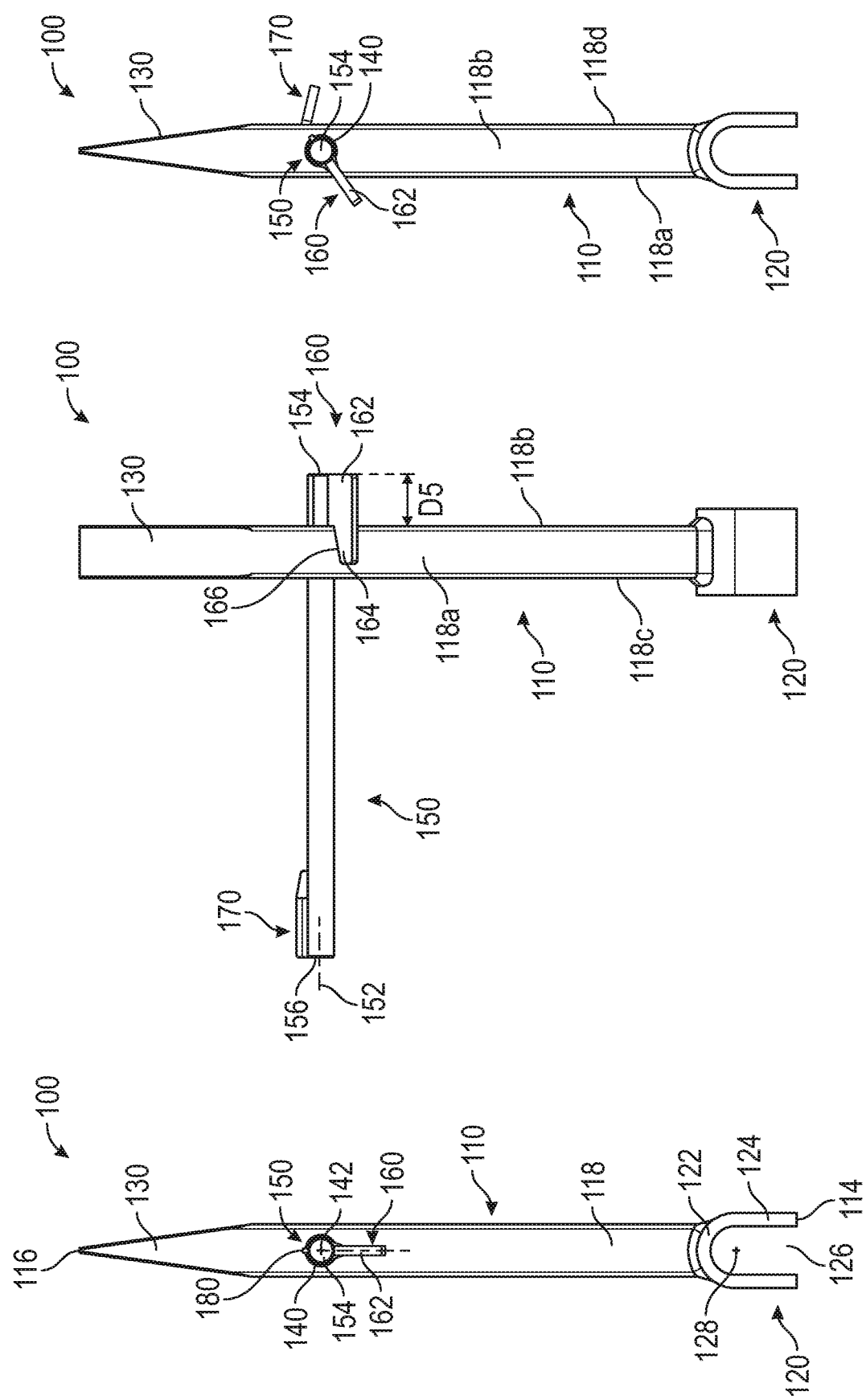

WATER METER TOOL

BACKGROUND

Embodiments described herein generally relate to a water meter tool. Conventional water meter tools may be formed of materials having low torque strength (e.g., die-cast aluminum). In addition, conventional water meter tools may require a large radial clearance (i.e., for turning a water meter valve). In that regard, conventional water meter tools may have a fixed cross arm. Furthermore, conventional water meter tools may not be adaptable to other tools for enhanced torqueing of the water meter tool. Embodiments of this disclosure overcome at least some of these issues.

SUMMARY

The present disclosure generally describes a water meter tool including a body and a movable cross arm. The body extends longitudinally from a first end to a second end. The body includes a water meter valve key at the first end and a hole formed through the body between the first and second ends, where a center line of the hole is in a transverse plane of the body. The movable cross arm is disposed through the hole. The movable cross arm extends along a longitudinal axis from a first arm end to a second arm end, and the movable cross arm includes a first box key proximate the first arm end.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3A is an isometric view of a water meter tool, in accordance with some embodiments.

FIG. 3B is a front view of the water meter tool of FIG. 3A.

FIG. 3C is a side view of the water meter tool of FIG. 3A.

FIG. 4A is a front view of a water meter tool without stakes, in accordance with some embodiments.

FIG. 4B is a side view of the water meter tool of FIG. 4A.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to a water meter tool including a body extending longitudinally from a first end to a second end. The body includes a water meter valve key at the first end and a hole formed through the body between the first and second ends, where a center line of the hole is in a transverse plane of the body. The water meter tool includes a movable cross arm disposed through the hole, where the movable cross arm extends along a longitudinal axis from a first arm end to a second arm end, and where the movable cross arm includes a first box key proximate the first arm end Embodiments of the present disclosure include a method for using a water meter tool including engaging the water meter tool to a water meter valve. The water meter tool includes a body extending longitudinally from a first end to a second end. The body includes a water meter valve key at the first end and a hole formed through the body between the first and second ends, where a center line of the hole is in a transverse plane of the body. The water meter tool includes a movable cross arm disposed through the hole, where the movable cross arm extends along a longitudinal axis from a first arm end to a second arm end, and where the movable cross arm includes a first box key proximate the first arm end. The method includes turning the body to operate the water meter valve.

Embodiments of the present disclosure include a method for manufacturing a water meter tool including cutting a body from bar stock, wherein the body extends longitudinally from a first end to a second end; machining a hole through the body between the first and second ends, wherein a center line of the hole is in a transverse plane of the body; welding a water meter valve key to the first end of the body; cutting a cross arm from bar stock, wherein the cross arm extends longitudinally from a first arm end to a second arm end; welding a first box key proximate the first arm end of the cross arm; assembling the cross arm to the body by inserting the second arm end of the cross arm through the hole; and welding a second box key proximate the second arm end of the cross arm.

Figure 1A:
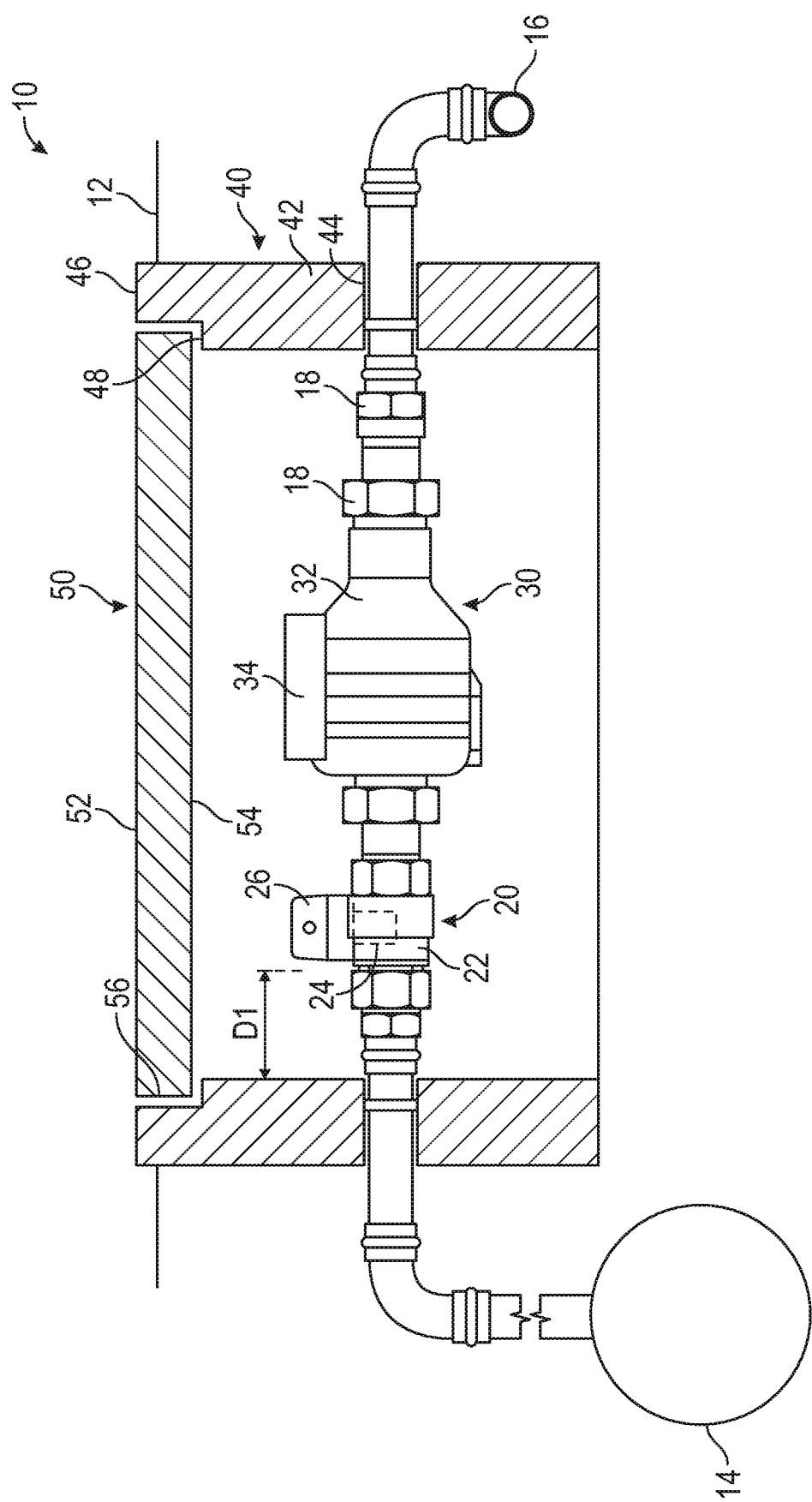
FIG. 1A is a partial side sectional view of a water meter assembly, as a working environment of a water meter tool in accordance with some embodiments.
Figure 1B:
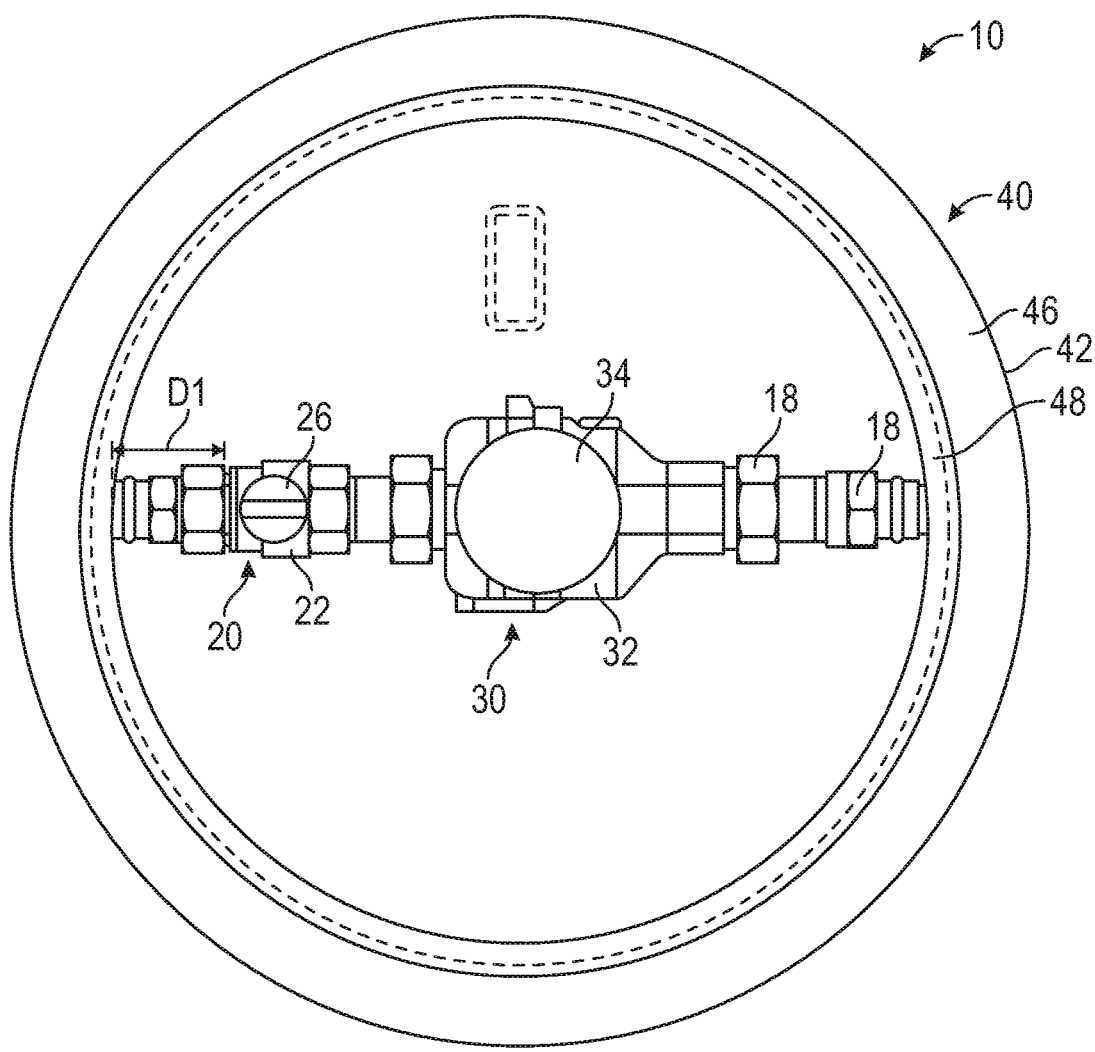
FIG. 1B is a plan view of the water meter assembly of FIG. 1A.

FIG. 1A is a partial side sectional view of a water meter assembly 10. FIG. 1B is a plan view of the water meter assembly 10 of FIG. 1A. The water meter assembly 10 described herein is exemplary of existing water meter assemblies which are known in the art. Hence, the water assembly 10 is described for understanding of a working environment of the water meter tool described in connection with FIGS. 3A-6.

Referring to FIGS. 1A-1B, the water meter assembly 10 includes a water meter valve 20, a water meter 30, a valve box 40, and a cover 50. The water meter assembly 10 is disposed below ground level 12 (i.e., an in-ground water meter assembly 10). The water meter assembly 10 is in fluid communication with a water main 14 at an upstream end and a supply line 16 at a downstream end. The water meter assembly 10 may also include various pipes and fittings 18 for connecting together in series the water main 14, the water meter valve 20, the water meter 30, and the supply line 16.

The water meter valve 20 regulates water flow from the water main 14 to the water meter 30. In some applications, the water meter valve 20 may be a straight ball valve, an angled ball valve, a gate valve, a globe valve, or another suitable shut-off valve. In some applications, the water meter valve 20 may be a quarter turn valve, a half turn valve, or another suitable valve. The water meter valve 20 includes a body 22 having a bore formed along a longitudinal axis of the body 22. The water meter valve 20 includes a stem 24 extending from the body 22. The stem 24 has a knob 26 for applying torque to the stem 24 for operating the water meter valve 20. In some embodiments, the knob 26 may be elongated and/or rectangular. The knob 26 may be subject to design standards (e.g., American Water Works Association (AWWA) standards). In some embodiments, the knob 26 may be sized according to the size of the water meter valve 20. For example, the knob 26 may have a first smaller size for water meter valves from 1% inch to 1 inch, and the knob 26 may have a second larger size for water meter valves from 1¼ inches to 2 inches. In some applications, the knob 26 may extend along the longitudinal axis of the body 22 when the water meter valve 20 is ON, and the knob 26 may extend perpendicular to the longitudinal axis of the body 22 when the water meter valve is OFF. Here, the knob 26 has a locking hole 28 formed therethrough for locking the water meter valve 20. In some other embodiments, the locking hole 28 may be omitted.

The water meter 30 measures water flow from the water main 14 to the supply line 16. The water meter 30 includes a body 32 having a bore formed along a longitudinal axis of the body 32. The water meter 30 includes a display 34 attached to the body 32 for displaying a cumulative measurement of water flow through the water meter 30. In some applications, the display 34 may be a dial, an analog display, a digital display, a wired connection or wireless transmitter in communication with a remote display, or another suitable display device.

The water meter valve 20 and the water meter 30 may be disposed within a valve box 40 having a cover 50. In some applications, the valve box 40 may be disposed below ground level 12. In some applications, at least a portion of the valve box 40 may extend above ground level 12. The valve box 40 includes a sidewall 42 surrounding an opening. In some applications, the valve box 40 may be circular, rectangular, square, or another suitable shape for accommodating the water meter valve 20 and the water meter 30. One or more ports 44 may be formed in the sidewall 42 for routing pipes 18 into and out of the valve box 40. In some other applications, the pipes 18 may be routed from underneath the valve box 40. The valve box 40 has a top face 46 formed at an upper end of the sidewall 42. The top face 46 may be flush with ground level 12. The valve box 40 includes a shoulder 48 formed along the sidewall 42.

In some applications, the water meter valve 20 may be located in close proximity to the sidewall 42 of the valve box 40. It will be appreciated that size is an important cost constraint when selecting a valve box 40 for installation. For that reason, the smallest commercially available valve box 40 that can accommodate the water meter valve 20 and the water 30 may commonly be selected for use. This often results in locating the water meter valve 20 close to the sidewall 42 as shown in FIGS. 1A-1B. In some applications, a distance D1 from the knob 26 of the water meter valve 20 to the sidewall 42 may be about 6 inches or less, such as about 4 inches or less, such as about 3 inches or less, such as about 2 inches or less, such as about 1 inch or less.

The cover 50 has a top 52, a bottom 54, and an outer edge 56. The cover 50 may be circular, rectangular, square, or another suitable shape for conforming to the valve box 40. The cover 50 encloses the valve box 40 while providing access to the water meter valve 20 and the water meter 30. The cover 50 covers the opening in the valve box 40. The cover 50 is accessible from above ground level 12. The cover 50 is disposed at about ground level 12. Alternatively, the cover 50 may be disposed slightly above or below ground level 12 depending on the position of the valve box 40. The cover 50 may be supported on the shoulder 48 with the bottom 54 contacting the shoulder 48. In some applications, the cover 50 may include a lock (not shown) on the bottom 54 for locking the cover 50 to the valve box 40. The lock may be installed (e.g., by a local municipality) to prevent break-in to the valve box 40. In some embodiments, the cover 50 may include one or more apertures (e.g., a keyhole or notch) for operating the lock from outside the valve box 40. It will be appreciated that locks and/or keyhole shapes may vary between municipalities and/or geographical regions.

The top 52 of the cover 50 is flush with the top face 46 of the valve box 40. In some applications, the cover 50 may be formed of plastic or metal. In some applications, the cover 50 may be a solid metal plate. In some applications, the cover 50 may form a friction fit between the outer edge 56 and the sidewall 42. Therefore, it will be appreciated that the cover 50 may be difficult to remove. In some embodiments, the one or more apertures mentioned above may provide a lifting point for lifting the cover 50 away from the valve box 40.

The covers 50 described herein are exemplary of existing valve box covers which are known in the art. Hence, the covers 50 are described for understanding of an operating environment of the water meter tool described in connection with FIGS. 3A-6.

Figure 2A:
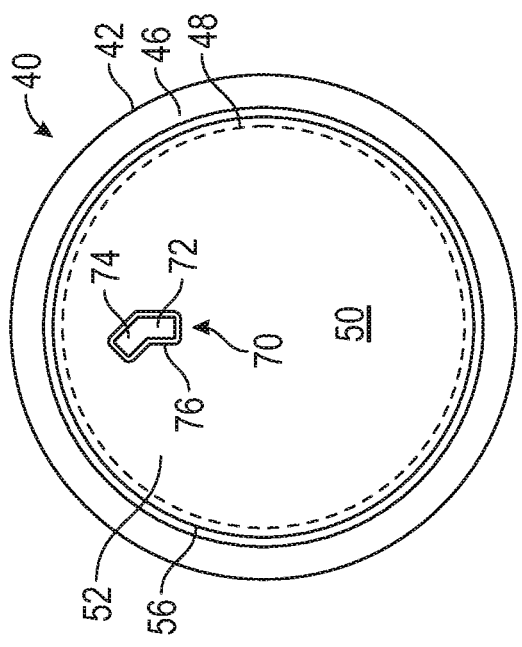
FIG. 2A is a plan view of a cover with a straight keyhole, as a working environment of the water meter tool.

FIG. 2A is a plan view of a cover 50 with a straight keyhole 60, in accordance with some embodiments. Referring to FIG. 2A, the cover 50 is seated on the valve box 40. The straight keyhole 60 is disposed through the cover from top 52 to bottom 54 and provides a lifting point for removing the cover 50. The straight keyhole 60 may be rectangular, square, oval, or another suitable shape. In some embodiments, the straight keyhole 60 may have a length of about 1.25 inches or more and a width of about 0.375 inches or more. In some embodiments, the straight keyhole 60 may be radially aligned. In some embodiments, the straight keyhole 60 may be off-center. The straight keyhole 60 includes a boss 62 surrounding the straight keyhole 60.

Figure 2C:
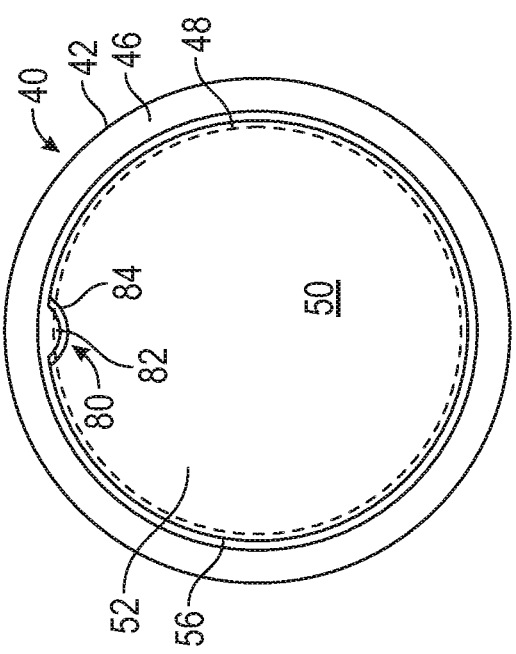
FIG. 2C is a plan view of a cover with a notch, as a working environment of the water meter tool.
Figure 2B:
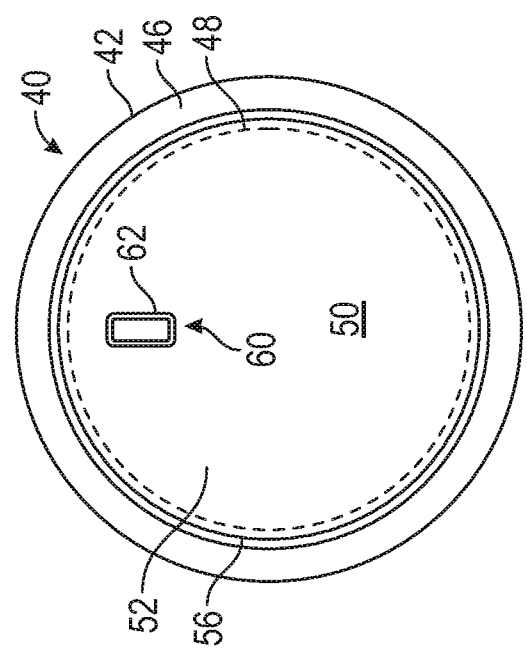
FIG. 2B is a plan view of a cover with an angled keyhole, as a working environment of the water meter tool.

FIG. 2B is a plan view of a cover 50 with an angled keyhole 70, in accordance with some embodiments. Referring to FIG. 2B, the cover 50 is seated on the valve box 40. The angled keyhole 70 is disposed through the cover from top 52 to bottom 54 and provides a lifting point for removing the cover 50. The angled keyhole 70 includes a first portion 72 and second portion 74. In some embodiments, the first portion 72 may have a length of about 0.625 inches or more and a width of about 0.375 inches or more. In some embodiments, the second portion 74 may have a length of about 0.5 inches or more and a width of about 0.125 inches or more. In some embodiments, an outer curve connecting the first and second portions 72, 74 may have a radius of from about 0.125 inches to about 0.25 inches. In some embodiments, the angled keyhole 70 may be radially aligned. In some embodiments, the angled keyhole 70 may be off-center. The angled keyhole 70 includes a boss 76 surrounding the angled keyhole 70.

FIG. 2C is a plan view of a cover 50 with a notch 80, in accordance with some embodiments. Referring to FIG. 2C, the cover 50 is seated on the valve box 40. The notch 80 is disposed through the cover from top 52 to bottom 54 and provides a lifting point for removing the cover 50. The notch 80 intersects the outer edge 56 of the cover 50. The notch 80 may be circular, rounded, square, rectangular, or another suitable shape. As illustrated in FIG. 2C, the notch 80 is circular. In some embodiments, the notch 80 may have a radius of about 0.5 inches or more. In some embodiments, the notch 80 may be sized to provide a radial gap 82 between the outer edge 56 of the cover 50 and the sidewall 42 of the valve box 40. The radial gap 82 may be adequately sized to enable a tool to fit underneath the bottom 54 of the cover 50 to assist in lifting the cover 50. In some embodiments, the notch 80 may be radially aligned. The notch 80 includes a boss 84 surrounding the notch 80.

FIG. 3A is an isometric view of a water meter tool 100, in accordance with some embodiments. FIG. 3B is a front view of the water meter tool 100 of FIG. 3A. FIG. 3C is a side view of the water meter tool 100 of FIG. 3A. Referring to FIGS. 3A-3C, the water meter tool 100 generally includes a body 110 and a movable cross arm 150. The body 110 extends longitudinally (i.e., along a longitudinal axis 112 of the body 110) from a first end 114 to a second end 116. The body 110 has sides 118 forming a square cross-section in a transverse plane (i.e., perpendicular to the longitudinal axis 112). Alternatively, the body 110 can have a hexagonal cross-section or a rectangular cross-section in the transverse plane. The shape of the body 110 may be configured such that the sides 118 of the body 110 may be engageable by an open end wrench, adjustable wrench, or another torque tool in the transverse plane. In some embodiments, the body 110 may be formed of steel or another suitable metal having suitable torque strength. In some embodiments, the body 110 may have a galvanized finish or another suitable protective finish to protect the body 110 from rust and/or other environmental corrosion.

The body 110 includes a water meter valve key 120 at the first end 114. The water meter valve key 120 has a base 122 attached to the body 110 and sides 124 extending along the longitudinal axis 112. The sides 124 form a slot 126 along a transverse axis 128. The sides 124 are configured to engage the knob 26 of the water meter valve 20. As described above, the knob 26 may be sized according to the size of the water meter valve 20. Here, the slot 126 is sized to fit a plurality of water meter valve knobs 26 having different dimensions (e.g., including all knobs subject to AWWA standards). In this way, the water meter valve key 120 can be used to turn the knob 26 to operate the water meter valve 20. The water meter valve key 120 is U-shaped. Alternatively, the water meter valve key 120 may be square, rectangular, or another suitable shape for fitting the knob 26 (FIGS. 1A-1B). The sides 124 of the water meter valve key 120 extend laterally beyond the body 110 along the transverse axis 128 in order to provide a greater length of the sides 124 for engaging the knob 26. In some embodiments, the sides 124 may extend beyond the body 110 by a width W1 in each direction relative to a width W2 of the body 110 along the transverse axis 128 by about 10% or more, such as about 20% or more, such as from about 20% to about 40%, such as about 33%. In other words, a ratio of a width of the water meter valve key 120 (W1+W2+W1) along the transverse axis 128 relative to the width W2 of the body 110 along the same axis may be about 1.2 or more, such as about 1.4 or more, such as from about 1.4 to about 1.8, such as about 1.67.

The body 110 includes a prybar 130 at the second end 116. The prybar 130 is configured to be inserted under the cover 50 of a valve box 40 and used to lift the cover 50. The prybar may be flat at the second end 116 and sized, for example, to fit within the radial gap 82 of the notch 80 and/or between the outer edge 56 of the cover 50 and the sidewall 42 of the valve box 40 (FIG. 2C). In some embodiments, the prybar 130 may be sized to fit between the outer edge 56 of the cover 50 and the sidewall 42 of the valve box 40 for prying open the cover 50. In some embodiments, an angle of the prybar 130 measured from the second end 116 may be from about 15 degrees to about 20 degrees.

The body 110 includes a hole 140 formed therethrough between the first and second ends 114, 116. A center line 142 of the hole 140 is in the transverse plane of the body 110. The hole 140 extends through the body 110 in the same direction as the slot 126 of the water meter valve key 120, such that the center line 142 of the hole 140 is aligned with the transverse axis 128 of the slot 126. Alternatively, the hole 140 can be formed in a different direction from the slot 126, such as where the center line 142 is perpendicular to the transverse axis 128. As illustrated, the hole 140 is circular. Alternatively, the hole 140 may be square, oval, or another suitable shape.

The movable cross arm 150 is disposed through the hole 140. The movable cross arm 150 extends along a longitudinal axis 152 from a first arm end 154 to a second arm end 156, such that the longitudinal axis 152 is generally aligned with the center line 142 of the hole 140. The movable cross arm 150 is freely longitudinally movable through the hole 140. The movable cross arm 150 is also freely rotatable around the longitudinal axis 152 in an unlocked position. In some embodiments, both the hole 140 and the movable cross arm 150 may be square, oval, or another suitable shape such that the movable cross arm 150 is locked (i.e., at least partially prevented from rotating around the longitudinal axis 152). In some embodiments, the movable cross arm 150 may be formed of steel or another suitable metal having suitable bending strength. In some embodiments, the movable cross arm 150 may have a galvanized finish or another suitable protective finish to protect the movable cross arm 150 from rust and/or other environmental corrosion.

The movable cross arm 150 includes a first box key 160 proximate the first arm end 154. In some embodiments, the first box key 160 is disposed at the first arm end 154. In some other embodiments, the first box key 160 may be spaced from the first arm end 154. The first box key 160 includes a plate having a first portion 162 extending radially from the movable cross arm 150 and a second portion 164 extending from the first portion 162 toward the second arm end 156. A notch 166 is formed between the movable cross arm 150 and the second portion 164. The first box key 160 is a straight box key (i.e., the first and second portions 162, 164 are in the same plane) for fitting and/or being insertable into the straight keyhole 60 (FIG. 2A). Alternatively, the first box key 160 can be an angled box key (i.e., the plate is bent such that the first and second portions 162, 164 are in different planes) for fitting and/or being insertable into the angled keyhole 70 (FIG. 2B).

The movable cross arm 150 includes a second box key 170 proximate the second arm end 156. In some embodiments, the second box key 170 is disposed at the second arm end 156. In some other embodiments, the second box key 170 may be spaced from the second arm end 156. The second box key 170 includes a plate having a first portion 172 extending radially from the movable cross arm 150 and a second portion 174 extending from the first portion 172 toward the first arm end 154. A notch 176 is formed between the movable cross arm 150 and the second portion 174. The second box key 170 is an angled box key, such that the first and second box keys 160, 170 are different. Alternatively, the second box key 170 can be a straight box key. In some embodiments, the first and second box keys 160, 170 are the same.

The first and second box keys 160, 170 are attached at radially opposite sides of the movable cross arm 150 (e.g., the first box key 160 is attached on a side of the movable cross arm 150 facing the first end 114 of the body 110, and the second box key 170 is spaced about 180 degrees from the first box key 160 such that the second box key 170 is attached on an opposite side of the movable cross arm 150 facing the second end 116 of the body 110). Alternatively the first and second box keys 160, 170 may be attached on the same side of the movable cross arm 150 (i.e., spaced by about 0 degrees), alternatively spaced from about 0 degrees to about 180 degrees, such as by about 45 degrees, alternatively spaced by about 90 degrees, alternatively spaced by about 135 degrees.

The movable cross arm 150 includes one or more first stakes 180 disposed between the body 110 and the first box key 160. The one or more first stakes 180 may include two stakes attached on radially opposite sides of the movable cross arm 150. In some embodiments, the one or more first stakes 180 may be longitudinally aligned with one or more of the first and second box keys 160, 170. The one or more first stakes 180 are curved. Alternatively, the one or more first stakes 180 may be circular, rectangular, square, or another suitable shape. The one or more first stakes 180 are configured to eliminate a pinch point by preventing the first box key 160 from coming into close proximity to and/or contacting the body 110.

The movable cross arm 150 includes one or more second stakes 190 disposed between the body 110 and the second box key 170. The one or more second stakes 190 may include two stakes attached on radially opposite sides of the movable cross arm 150. In some embodiments, the one or more second stakes 190 may be longitudinally aligned with one or more of the first and second box keys 160, 170. The one or more second stakes 190 are curved. Alternatively, the one or more second stakes 190 may be circular, rectangular, square, or another suitable shape. The one or more second stakes 190 are configured to eliminate another pinch point by preventing the second box key 170 from coming into close proximity to and/or contacting the body 110.

It will be appreciated that the first and second stakes 180, 190 may be longitudinally spaced from the first and second box keys 160, 170, respectively, by a distance D2 adequate to accommodate one or more grasping appendages. In some embodiments, the distance D2 may be about 0.5 inches or more, such as from about 0.5 inches to about 0.75 inches, such as from about 0.5 inches to about 0.625 inches, alternatively from about 0.625 inches to about 0.75 inches.

Based on the position of the first and second stakes 180, 190, the movable cross arm 150 may be longitudinally movable in each direction relative to a longitudinal center of the cross arm 150 by a distance D3 of from about 1.25 inches to about 2 inches, such as from about 1.5 inches to about 1.75 inches. In some embodiments, a ratio of longitudinal range of motion (2×D3) to an overall length of the cross arm 150 (measured from the first arm end 154 to the second arm end 156) may be from about 30% to about 60%, such as from about 40% to about 45%, alternatively from about 45% to about 50%, alternatively from about 50% to about 55%.

In some embodiments, when the one or more first stakes 180 are in contact with the body 110, a distance D4 from the body 110 to the first arm end 154 may be from about 1.75 inches to about 2 inches, such as from about 1.75 inches to about 1.875 inches, alternatively from about 1.875 inches to about 2 inches. In some embodiments, a ratio of the distance D4 to a distance from the longitudinal center of the cross arm 150 to the first arm end 154 (D3+D4) may be from about 35% to about 65%, such as from about 40% to about 50%, alternatively from about 50% to about 60%. In some embodiments, when the one or more second stakes 190 are in contact with the body 110, any of the foregoing dimensions may apply to the opposite end of the movable cross arm 150 without limitation.

FIG. 4A is a front view of a water meter tool 100 without stakes, in accordance with some embodiments. FIG. 4B is a side view of the water meter tool 100 of FIG. 4A. The movable cross arm 150 is freely longitudinally movable through the hole 140 such that either of the first and second box keys 160, 170 may contact the body 110. Referring to FIGS. 4A-4B, the water meter tool 100 is in a first locked position where the first box key 160 is contacting the body 110. As illustrated, the first box key 160 is straight. Alternatively, the first box key 160 can be angled. In the first locked position, the movable cross arm 150 is moved longitudinally such that the body 110 is at least partially disposed in the notch 166 of the first box key 160. In the first locked position, the movable cross arm 150 is rotated around the longitudinal axis 152 in a first direction such that the second portion 164 of the first box key 160 is contacting a first side 118a of the body 110 preventing further rotation of the movable cross arm 150 in the first direction.

A second side 118b of the body 110 facing the first arm end 154 of the movable cross arm 150 is in contact with the first portion 162 of the first box key 160 in the first locked position. Alternatively, the second side 118b may be spaced from the first portion 162 even in the first locked position.

Figure 4D:
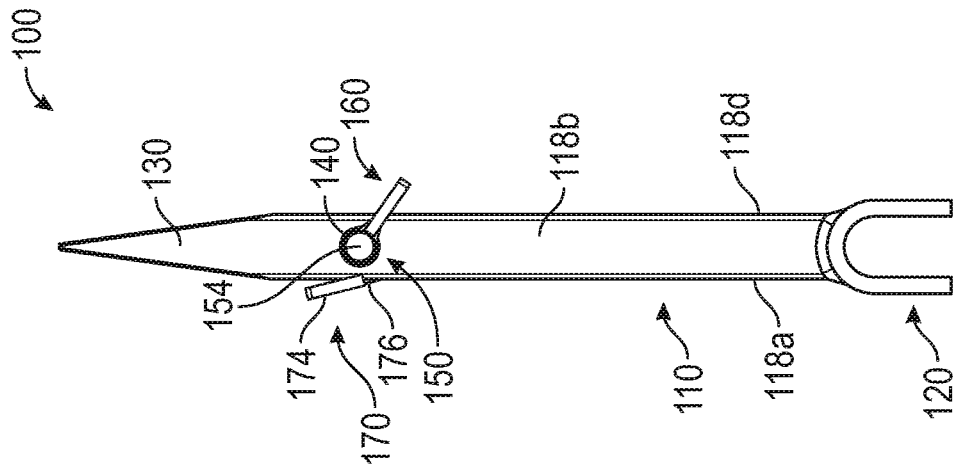
FIG. 4D is a side view of the water meter tool of FIG. 4C.
Figure 4C:
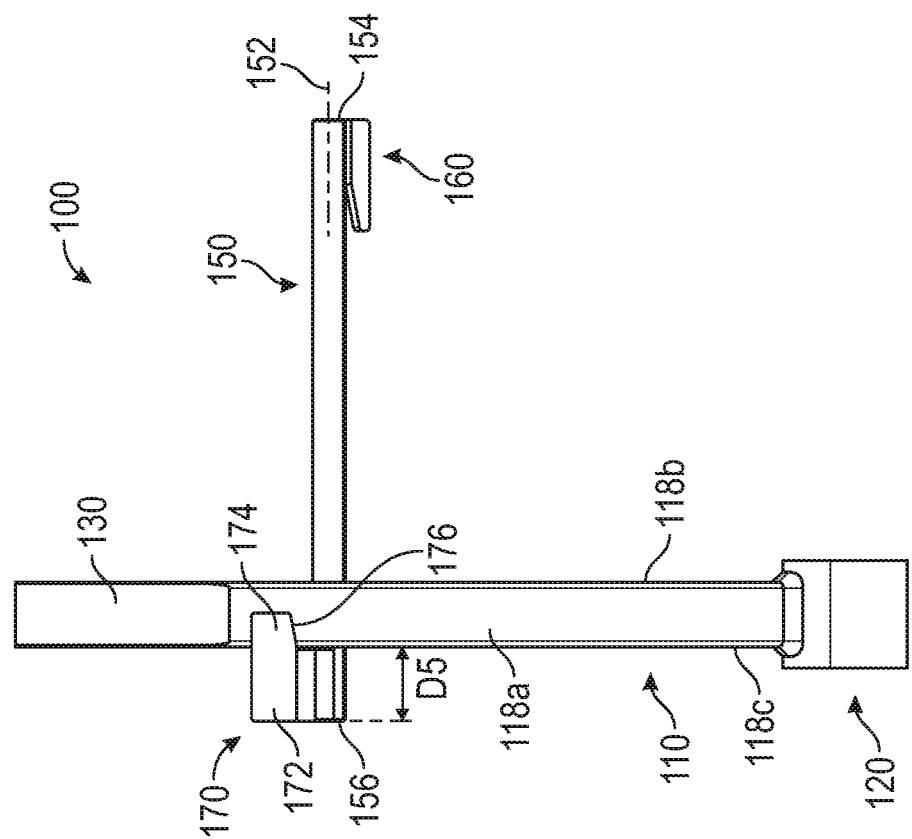
FIG. 4C is a front view of the water meter tool of FIG. 4A illustrating the water meter tool in a second locked position, in accordance with some embodiments.

FIG. 4C is a front view of the water meter tool 100 of FIG. 4A illustrating the water meter tool 100 in a second locked position, in accordance with some embodiments. FIG. 4D is a side view of the water meter tool 100 of FIG. 4C. In the second locked position, the second box key 170 is contacting the body 110. As illustrated, the second box key 170 is angled. Alternatively, the second box key 170 can be straight. In the second locked position, the movable cross arm 150 is moved longitudinally such that the body 110 is at least partially disposed in the notch 176 of the second box key 170. In the second locked position, the movable cross arm 150 is rotated around the longitudinal axis 152 in a second direction opposite the first direction such that the second portion 174 of the second box key 170 is contacting the first side 118a of the body 110 preventing further rotation of the movable cross arm 150 in the second direction.

A third side 118c of the body 110 facing the second arm end 156 of the movable cross arm 150 is in contact with the first portion 172 of the second box key 170 in the second locked position. Alternatively, the third side 118c may be spaced from the first portion 172 even in the second locked position.

It will be appreciated that the first and second box keys 160, 170 may be locked in various other positions relative to the body 110, and the specific embodiments described herein are not intended to be limiting. For example, the first box key 160 may be rotated in the second direction to lock with the first side 118a of the body 110. Alternatively, the first box key 160 may be locked with a fourth side 118d of the body 110 by rotating in either of the first or second directions.

Likewise, the second box key 170 may be rotated in the second direction to be locked with the fourth side 118*d* of the body 110.

In any of the locked positions described herein, rotation of the movable cross arm 150 around the longitudinal axis 152 is at least partially prevented such that the movable cross arm 150 can be braced against the body 110 as the body 110 is turned to operate the water meter valve 20. In some embodiments, the movable cross arm 150 can be locked to the body 110 to increase leverage when turning one of the first or second box keys 160, 170 to unlock the cover 50 as described herein. In any of the locked positions described herein, the movable cross arm may extend beyond the body 110 by a distance D5 of about 1 inch or less, such as from about 0.5 inches to about 1 inch, such as from about 0.625 inches to about 1 inch, such as from about 0.625 inches to about 0.75 inches, alternatively from about 0.75 inches to about 0.875 inches, alternatively from about 0.875 inches to about 1 inch. In some embodiments, a ratio of the distance D5 to a distance from the longitudinal center of the cross arm 150 to either of the first or second arm ends 154, 156 (i.e., a radial clearance required for a water meter tool having a fixed cross arm) may be from about 5% to about 20%, such as from about 5% to about 10%, alternatively from about 10% to about 15%, alternatively from about 15% to about 20%.

In some embodiments, the water meter tool 100 of FIGS. 3A-3C may also be configured to move to any of the locking positions described herein. In one embodiment, one or more slots (not shown) may be formed through the body 110. The one or more slots may be aligned with the first and second stakes 180, 190 such that the stakes can move through the body 110 enabling the first and second box keys 160, 170 to come into contact with the body 110 for locking. In some embodiments, the one or more slots may have a maximum arc length of about 30 degrees or less, such as about 15 degrees or less, to prevent the first and second stakes 180, 190 from inadvertently moving through the one or more slots, which could result in a pinch hazard.

Figure 5:
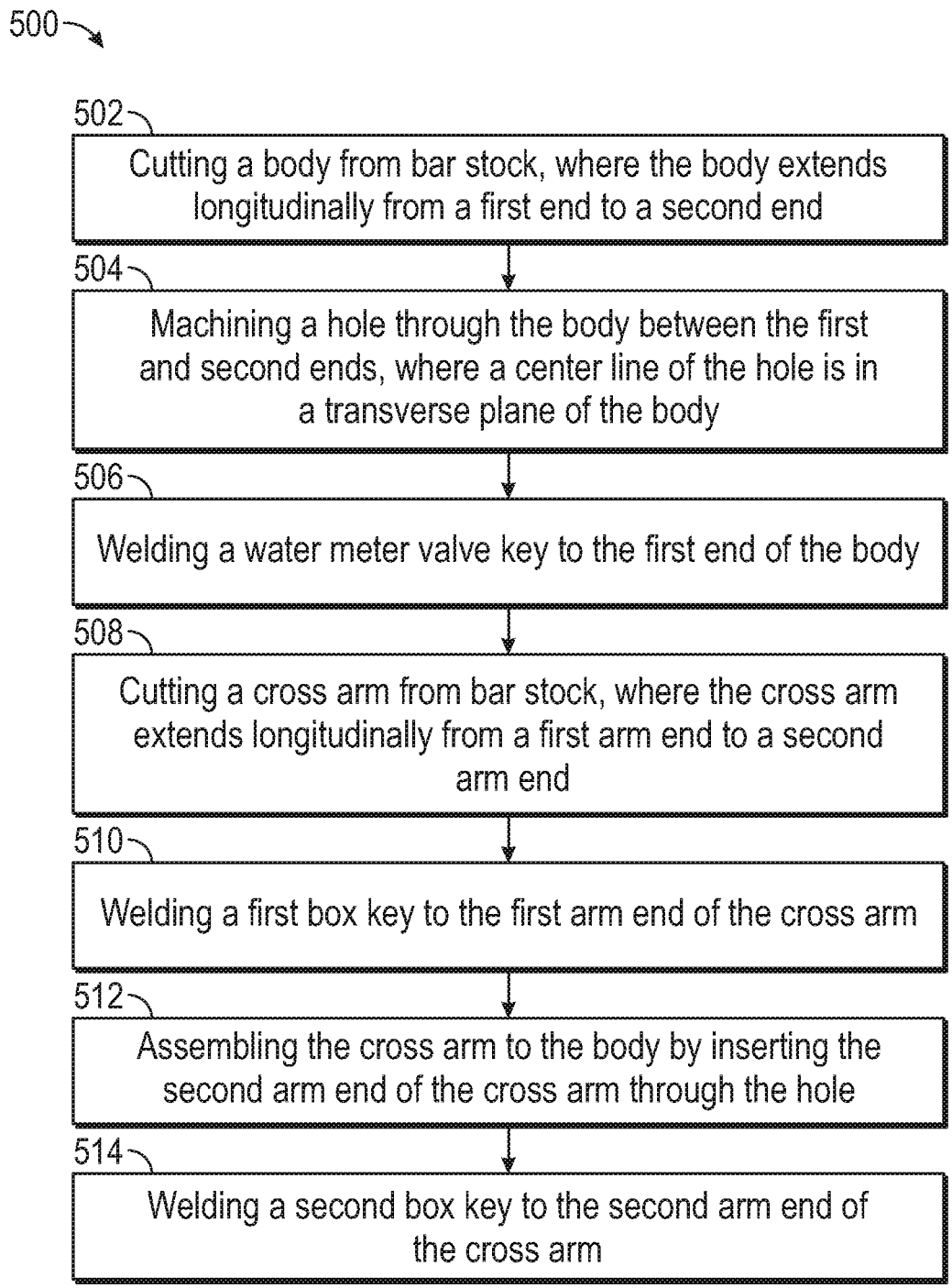
FIG. 5 is a flow chart illustrating a method for manufacturing a water meter tool, in accordance with some embodiments.

FIG. 5 is a flow chart illustrating a method 500 for manufacturing a water meter tool 100, in accordance with some embodiments. At step 502, the method 500 includes cutting the body 110 from bar stock, where the body 110 extends longitudinally from the first end 114 to the second end 116.

In some embodiments, the method 500 may include machining the body 110 to form a depression at the first end 114, where the depression is substantially conformal to a bend of the water meter valve key 120. Thus, an attachment face between the first end 114 and the water meter valve key 120 may be about flush in order to form a robust welded assembly. In some embodiments, the method 500 may include machining the body 110 to form a prybar 130 at the second end 116.

At step 504, the method 500 includes machining the hole 140 through the body 110 between the first and second ends 114, 116, where the center line 142 of the hole 140 is in a transverse plane of the body 110.

At step 506, the method 500 includes welding the water meter valve key 120 to the first end 114 of the body 110. In some embodiments, forming the water meter valve key 120 may include stamping the water meter valve key 120 from flat bar stock and bending the water meter valve key 120 to a U-shape.

At step 508, the method 500 includes cutting the cross arm 150 from bar stock, where the cross arm 150 extends longitudinally from the first arm end 154 to the second arm end 156.

At step 510, the method 500 includes welding the first box key 160 proximate the first arm end 154 of the cross arm 150. In some embodiments, forming the first box key 160 may include stamping the first box key 160 from flat bar stock and optionally, bending the first box key 160 to form an angled box key.

At step 512, the method 500 includes assembling the cross arm 150 to the body 110 by inserting the second arm end 156 of the cross arm 150 through the hole 140.

At step 514, the method 500 includes welding the second box key 170 proximate the second arm end 156 of the cross arm 150. In some embodiments, forming the second box key 170 may include stamping the second box key 170 from flat bar stock and optionally, bending the second box key 170 to form an angled box key.

In some embodiments, the method 500 may include staking the cross arm 150 after assembling the cross arm 150 to the body 110. In some embodiments, staking may include affixing first and second stakes 180, 190 to the cross arm 150 on respective sides of the body 110.

In some embodiments, the method 500 may include performing vibratory deburring of the water meter tool 100 after assembly. In some embodiments, the method 500 may include galvanizing the water meter tool 100 after assembly.

Figure 6:
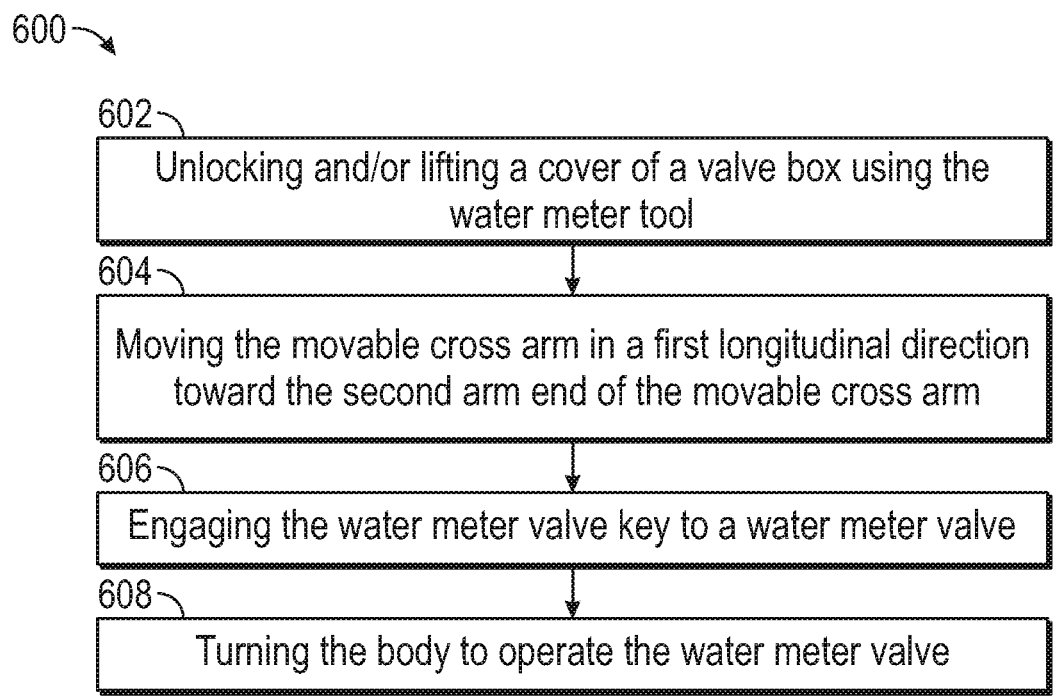
FIG. 6 is a flow chart illustrating a method for using a water meter tool, in accordance with some embodiments.

FIG. 6 is a flow chart illustrating a method 600 for using a water meter tool 100, in accordance with some embodiments. At step 602, the method 600 includes unlocking and/or lifting the cover 50 of the valve box 40 using the water meter tool 100. In some embodiments, unlocking the cover 50 may optionally include inserting the first box key 160 into the keyhole 60, 70 formed in the cover 50 of the valve box 40 and turning the first box key 160 to unlock the cover 50. In some embodiments, lifting the cover 50 may optionally include inserting the first box key 160 into the keyhole 60, 70 formed in the cover 50 of the valve box 40 and using the first box key 160 to lift the cover 50. In some embodiments, the first box key 160 may be a straight box key for being insertable into the straight keyhole 60. Alternatively, the first box key 160 may be an angled box key for being insertable into the angled keyhole 70. In some other embodiments, lifting the cover 50 may optionally include inserting the prybar 130 under the cover 50 of the valve box 40 and using the prybar 130 to lift the cover 50. In some embodiments, the prybar 130 may be inserted into the notch 80, into the radial gap 82, and/or between the outer edge 56 of the cover 50 and the sidewall 42 of the valve box 40.

At step 604, the method 600 optionally includes moving the movable cross arm 150 in a first longitudinal direction toward the second arm end 156 of the movable cross arm 150 (FIGS. 4A-4B) before engaging the water meter valve key 120 to the water meter valve 20.

In some embodiments, the water meter valve 20 may be located in close proximity to the sidewall 42 of the valve box 40 (FIGS. 1A-1B), such that if the movable cross arm 150 was fixed to the body 110 at about the longitudinal center of the movable cross arm 150, each of the first and second arm ends 154, 156 of the movable cross arm 150 would extend from the body 110 farther than the distance D1. Thus, when the water meter valve key 120 would be engaged with the water meter valve 20, at least one of the first and second arm ends 154, 156 would contact the sidewall 42 of the valve box 40 hindering rotation of the knob 26 of the water meter valve 20 via the water meter tool 100. For example, contact with the sidewall 42 may require the water meter tool 100 to be slanted relative to vertical, which can result in slippage between the water meter valve key 120 and the knob 26 hindering and/or preventing rotation of the knob 26 to operate the water meter valve 20.

However, the water meter tool 100 of the present disclosure overcomes the foregoing problem namely by configuring the movable cross arm 150 to selectively reduce the extension of one of the first or second arm ends 154, 156. For example, moving the movable cross arm 150 in the first longitudinal direction prevents the movable cross arm 150 from contacting the valve box 40 when the water meter valve key 120 is engaged with the water meter valve 20.

In some embodiments, the water meter valve 20 may be over torqued or corroded making operation difficult. It will be appreciated that if the movable cross arm 150 was fixed to the body 110, the water meter tool 100 would have a fixed lever arm. The water meter tool 100 of the present disclosure overcomes this problem namely by configuring the movable cross arm 150 to selectively lengthen the lever arm. For example, moving the movable cross arm 150 in the first longitudinal direction lengthens a lever arm of the water meter tool 100 to provide a torsional advantage for turning the body 110.

At step 606, the method 600 includes engaging the water meter valve key 120 to the water meter valve 20.

At step 608, the method 600 includes turning the body 110 to operate the water meter valve 20. In some embodiments, turning the body 110 may optionally include engaging a wrench or another torque tool to the body 110 in the transverse plane and using the wrench to turn the body 110.

While the foregoing is directed to embodiments of the present disclosure, other and further embodiments of the disclosure may be devised without departing from the basic scope thereof, and the scope thereof is determined by the claims that follow.

What is claimed is:

1. A water meter tool, comprising:
    a body extending longitudinally from a first end to a second end, the body including:
        a water meter valve key at the first end; and
        a hole formed through the body between the first and second ends, wherein a center line of the hole is in a transverse plane of the body; and
    a movable cross arm disposed through the hole, wherein the movable cross arm extends along a longitudinal axis from a first arm end to a second arm end and wherein the movable cross arm includes a first box key proximate the first arm end.

2. The water meter tool of claim 1, wherein the first box key includes a plate having a first portion extending radially from the movable cross arm and a second portion extending from the first portion toward the second arm end, wherein a notch is formed between the movable cross arm and the second portion.

3. The water meter tool of claim 2, wherein the movable cross arm is configured to move longitudinally through the hole to a locked position, wherein the body is at least partially disposed in the notch in the locked position, and wherein rotation of the movable cross arm around the longitudinal axis is at least partially prevented in the locked position.

4. The water meter tool of claim 1, wherein the body includes a second box key proximate the second arm end, wherein the second box key is different from the first box key.

5. The water meter tool of claim 4, wherein the first and second box keys are attached at radially opposite sides of the movable cross arm.

6. A method for manufacturing a water meter tool, comprising:
    cutting a body from bar stock, wherein the body extends longitudinally from a first end to a second end;
    machining a hole through the body between the first and second ends, wherein a center line of the hole is in a transverse plane of the body;
    welding a water meter valve key to the first end of the body;
    cutting a cross arm from bar stock, wherein the cross arm extends longitudinally from a first arm end to a second arm end;
    welding a first box key proximate the first arm end of the cross arm;
    assembling the cross arm to the body by inserting the second arm end of the cross arm through the hole; and
    welding a second box key proximate the second arm end of the cross arm.

7. The method of claim 6, further comprising:
    stamping the water meter valve key from flat bar stock; and
    bending the water meter valve key to a U-shape.

8. The method of claim 6, further comprising:
    stamping the first and second box keys from flat bar stock; and
    bending one of the first and second box keys to form an angled box key.

9. The method of claim 6, further comprising staking the cross arm after assembling the cross arm to the body.

* * * * *